(12) United States Patent
Wong et al.

(10) Patent No.: US 7,214,433 B2
(45) Date of Patent: May 8, 2007

(54) LAMINATED STRUCTURES WITH SUPERIOR IMPACT RESISTANCE AND PROCESS FOR MAKING SAME

(75) Inventors: Bert C. Wong, Hockessin, DE (US); C. Anthony Smith, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/509,288

(22) PCT Filed: May 15, 2003

(86) PCT No.: PCT/US03/16535

§ 371 (c)(1), (2), (4) Date: Sep. 23, 2004

(87) PCT Pub. No.: WO03/097347

PCT Pub. Date: Nov. 27, 2003

(65) Prior Publication Data

US 2005/0118445 A1 Jun. 2, 2005

Related U.S. Application Data

(60) Provisional application No. 60/381,494, filed on May 16, 2002.

(51) Int. Cl.
*B32B 17/10* (2006.01)
(52) U.S. Cl. ............... 428/441; 428/442; 428/412; 428/426; 428/429; 428/334; 428/411.1
(58) Field of Classification Search ............ 428/441, 428/442, 412, 426, 429, 334, 411.1
See application file for complete search history.

(56) References Cited

U.S. PATENT DOCUMENTS

| | | | |
|---|---|---|---|
| 3,153,009 A * | 10/1964 | Rombach ............ | 525/61 |
| 4,230,771 A | 10/1980 | Phillips | |
| 4,276,351 A * | 6/1981 | Phillips ............ | 428/437 |
| 4,297,262 A | 10/1981 | Phillips | |
| 4,663,228 A * | 5/1987 | Bolton et al. ........ | 428/334 |
| 4,696,971 A * | 9/1987 | Degeilh ............ | 525/61 |
| 5,187,217 A | 2/1993 | Degeilh et al. | |
| 5,227,241 A * | 7/1993 | Chaussade et al. ..... | 428/437 |
| 5,393,365 A | 2/1995 | Smith | |
| 5,501,910 A | 3/1996 | Smith | |
| 5,567,529 A | 10/1996 | Smith | |
| 5,573,842 A | 11/1996 | Gutweiler | |
| 5,631,089 A | 5/1997 | Center, Jr. et al. | |
| 5,886,075 A | 3/1999 | Keane et al. | |
| 5,908,674 A | 6/1999 | Schindler et al. | |
| 6,737,151 B1 | 5/2004 | Smith | |
| 6,800,355 B2 * | 10/2004 | Wong ............... | 428/141 |
| 2003/0124296 A1 | 7/2003 | Smith | |
| 2005/0019536 A1 | 1/2005 | Rymer et al. | |
| 2005/0131133 A1 | 6/2005 | Wong et al. | |
| 2005/0192398 A1 | 9/2005 | Wong et al. | |

FOREIGN PATENT DOCUMENTS

| | | |
|---|---|---|
| EP | 0 102 502 A1 | 3/1984 |
| GB | 828381 | 2/1960 |
| WO | WO 01/43963 A1 | 6/2001 |

OTHER PUBLICATIONS

PCT International Search Report for International application No. PCT/US03/16535 dated Sep. 25, 2003.
PCT Written Opinion for International application No. PCT/US03/16535 dated Jan. 27, 2004.

* cited by examiner

*Primary Examiner*—Leszek Kiliman

(57) ABSTRACT

The present invention is a laminate article comprising at least three layers of plasticized polyvinylbutyral (PVB) sheet, wherein at least one layer of the laminate is a stiff PVB sheet and at least two layers are soft PVB sheets. A laminate article of the present invention is useful for providing increased protection from damages occurring to automobiles, buildings, and windows by virtue of exposure of same to, for example, hurricane force winds, impact from debris propelled by high-force winds, or by intentional impact against windows comprising the laminates of the present invention.

22 Claims, No Drawings

LAMINATED STRUCTURES WITH SUPERIOR IMPACT RESISTANCE AND PROCESS FOR MAKING SAME

This application claims the benefit of U.S. Provisional Application No. 60/381,494, filed May 16, 2002.

BACKGROUND OF THE INVENTION

Plasticized polyvinyl butyral sheet (PVB) is used in the manufacture of laminate structures such as, for example: windshields for vehicles including automobiles, motorcycles, boats and airplanes; homes and buildings; shelving in cabinets and display cases; and other articles where structural strength and laminate stability is desirable in a glass sheet. For the purposes of the present application, laminate stability refers to the ability of glass to remain adhered to PVB and/or the ability of the laminate layers to remain substantially together under harsh or even extreme circumstances. In some special applications, superior impact resistance and laminate stability is required, or highly preferable. For example, it can be preferred that laminates used in homes and other buildings withstand the harsh conditions prevalent in hurricanes, tornadoes, and/or severe wind storms.

A wide variety of glass laminates formed with PVB are known and described in U.S. Pat. No. 4,297,262; U.S. Pat. No. 4,230,771; and, British Patent 828,381. Typically, PVB is plasticized to have low stiffness and deform readily upon impact—which is an excellent property for automotive windshields wherein human impact is involved and passenger retention in a crash, and hence, reduction in fatality is desired. However, these are not the properties required for architectural windows exposed to high stresses, nor for side windows for automobiles and trucks that may be subjected to criminal actions. The properties of low stiffness and high elasticity limit performance when the laminate must provide intrusion resistance after the glass of the laminate has broken; for example, when a glass laminate is subjected to high wind load, and/or impact of flying debris as occurs in a hurricane, or where there is repeated impact to a window by a criminal attempting to break into a vehicle or structure. Conventional PVB laminates such as windshields or standard architectural laminated glass perform poorly in tests designed to evaluate the performance of a laminate under hurricane conditions, such as the Dade County, Fla. hurricane window system test protocol wherein there is a severe impact test followed by a pressure cycling test conducted on the shattered laminate.

Conventional PVB laminates can eventually fail in a hurricane when they are subjected to pressure loading and cycling. Failure can be due to either the large deformation of the polymer interlayer which can cause the laminate to pull out of the window frame, and/or due to the action of shards of broken glass which eventually cut into the PVB layer and allow air pressure or other threat to permeate the structure that the laminate is intended to protect. Conventional laminates can also be penetrated more readily with instruments used by a criminal attempting to gain entry through the laminate. The use of layers of PVB that are thicker than the standard laminate to gain more stiffness and cut-through resistance is impractical due to cost and the excessive thickness of the interlayer required. Similarly, the use of stiffer PVB of conventional thickness is difficult because the stiff PVB is more difficult to process, and there is considerable manufacturing yield loss.

Stiffer glass laminates have been made using interlayers other than PVB, such as polyurethanes and thermoplastic copolymers and all of these, including PVB, in combination with polyester film and polycarbonate films. Bolton et al, U.S. Pat. No. 4,663,228, for example, describes the use of an ionomer resin to form tough glass laminates.

There is an increased need for glass laminates for use as architectural windows that are resistant to the threats of wind storms and hurricanes, particularly in coastal areas. There is also a need for side windows for vehicles that are intrusion resistant. These glass laminates are required to have improved toughness and stability. They must also be easily fabricated, and have good optical properties—including color and clarity.

It is desirable to meet such needs with a PVB laminate that is tough, stable, and easily fabricated, and has good optical properties. These, and other objects of the invention will become apparent to the reader.

SUMMARY OF THE INVENTION

In one aspect, the present invention is a laminate article comprising at least two layers of soft plasticized polyvinylbutyral (PVB) sheet having a $T_g$ in the range of from about 32° C. to about 35° C. and further comprising at least one layer of a stiff PVB interlayer sheet, wherein the stiff interlayer: (i) has a $T_g$ of from about 35° C. to about 60° C.; (ii) is positioned between at least two layers of soft PVB; and, (iii) comprises a bleaching compound.

DETAILED DESCRIPTION OF THE INVENTION

In one embodiment, the present invention is a laminate article comprising at least three layers of plasticized polyvinylbutyral (PVB) sheet, wherein at least one layer of the laminate is a stiff PVB sheet and at least two layers are soft PVB sheets. A laminate article of the present invention is useful for providing increased protection from damages occurring to automobiles, buildings, and windows by virtue of exposure of same to, for example, hurricane force winds, impact from debris propelled by high winds, or by intentional impact against windows comprising the laminates of the present invention.

In the practice of the present invention, both soft and stiff PVB can be manufactured according to conventional processes known in the art of PVB manufacture. For example, a method of producing a soft PVB composition suitable for the practice of the present invention is described in U.S. Pat. No. 3,153,009, incorporated herein by reference. Plasticized PVB sheeting can be prepared by processes well known in the art. U.S. Pat. No. 4,276,351 describes a process for preparing plasticized PVB sheeting. U.S. Pat. No. 4,696,971 also describes a process for manufacturing plasticized PVB sheeting. U.S. Pat. No. 5,886,075 describes yet another process for manufacturing plasticized PVB sheeting.

A laminate of the present invention comprises at least two layers, or zones, of soft PVB. Soft PVB, as the term is used in the present invention, refers to PVB sheet that has a glass transition temperature ($T_g$) in the range of from about 32° C. to about 42° C., as measured by Dynamic Mechanical Analysis ASTM D4065 (DMA), using the tangent delta (phase shift at 1 Hz) data as indicator.

In addition to at least two soft PVB sheets, a laminate of the present invention comprises at least one layer of a stiff PVB resin. A stiff layer of PVB, as the term is used herein, is PVB sheet having a $T_g$ of greater than about 42° C. to about 60° C., as measured by DMA ASTM D4065, using the tangent delta (phase shift at 1 Hz) data as indicator. Preferably, the $T_g$ is from about 45° C. to about 57° C., more preferably from about 47° C. to about 57° C., most preferably from about 50° C. to about 55° C.

The $T_g$ of a PVB sheet can be dependent upon the concentration of plasticizer included in the composition. A soft PVB sheet of the present invention is plasticized with at least about 30 parts per hundred (pph) of a plasticizer. Preferably soft PVB of the present invention is plasticized with from about 30 to about 50 pph, based upon the total dry weight of the resin. The "dry weight" as used herein refers to the weight of the dry resin, that is, after water has been removed from the unplasticized PVB resin. More preferably the plasticizer is present in an amount of from about 30 to about 45 pph, and most preferably in an amount of from about 32 to about 45 pph. A stiff PVB sheet of the present invention preferably includes plasticizer in an amount of from about 5 to about 30 pph, more preferably the plasticizer content is from about 15 to about 30 pph. Even more preferably the plasticizer content is from about 18 to about 28 pph, and most preferably from about 18 to about 22 pph.

Plasticizers of the present invention can be chosen from any that are known or used conventionally in the manufacture of plasticized PVB sheeting compositions. For example, a plasticizer suitable for use herein can be a plasticizer or a mixture of plasticizers selected from the group consisting of: diesters obtained from the chemical reaction of aliphatic diols with carboxylic acids, including diesters of polyether diols or polyether polyols; and, esters obtained from polyvalent carboxylic acids and aliphatic alcohols. For convenience, when describing the sheet compositions of the present invention, a mixture of plasticizers can be referred to herein as "plasticizer". That is, the singular form of the word "plasticizer" as used herein can represent the use of either one plasticizer or the use of a mixture of two or more plasticizers in a given sheet composition. The intended use will be apparent to a reader skilled in the art. Preferred plasticizers for use herein are diesters obtained by the reaction of triethylene glycol or tetraethylene glycol with aliphatic carboxylic acids having from 6 to 10 carbon atoms; and diesters obtained from the reaction of sebacic acid with aliphatic alcohols having from 1 to 18 carbon atoms. More preferably the plasticizer is either tetraethylene glycol di-n-heptanoate (4G7), triethylene glycol di-2-ethyl hexanoate (3GO) or dibutyl sebacate (DBS). Most preferably the plasticizer is 3GO.

Extrusion of a stiff PVB resin composition of the present invention can require high extrusion temperatures relative to the temperatures required to extrude soft PVB. For example, PVB resin plasticized with less than about 30 pph plasticizer can be extruded at a temperature of from about 225° C. to about 245° C. Preferably the resin can be extruded at a temperature of from about 227° C. to about 245° C. More preferably, the resin can be extruded at a temperature of from about 228° C. to about 242° C., and most preferably from about 230° C. to about 240° C. Soft PVB can be extruded at a temperature of from about 175° C. to about 225° C.

In a particularly preferred embodiment, PVB interlayers used in a laminate of the present invention has a YID color of less than 12. Due to higher extrusion temperature necessary to process stiff PVB, which can result in undesirable color in the PVB sheet, the composition of the present invention includes at least one PVB bleaching compound. A PVB bleaching compound (bleaching compound) of the present invention is any compound that can reduce or eliminate color from a PVB resin relative to the color of an otherwise identical resin, treated using an identical or similar process, with the exception that a bleaching compound is not present. The mode of the bleaching action demonstrated by the bleaching compound is not critical to the present invention. For example, a bleaching compound useful in the practice of the present invention can be a compound that reacts directly with color-forming compounds (color bodies) present in a PVB resin composition, or a compound that is capable of yielding a compound that reacts directly with color-bodies. A bleaching compound can be a compound that can decompose in situ to yield decomposition products capable of reacting with color bodies present in a PVB resin composition. A bleaching compound in the practice of the present invention can be a compound that inhibits the formation of color bodies. Bleaching compounds of the present invention include, for example, inorganic bisulfites such as sodium or potassium bisulfite; organic bisulfites such as tetramethylammonium bisulfite; and compounds similar in structure or function. Bleaching compounds also include sulfosuccinates such as dialkyl sulfosuccinates. For example, the present invention can include sodium dioctyl sulfosuccinate (DOSS) as a bleaching compound.

A bleaching compound of the present invention can be included in any effective finite amount. An effective amount for the purposes of the present invention is any amount that reduces the color of a PVB resin that includes a bleaching compound relative to the color of an identical or substantially similar PVB resin composition that does not include the bleaching compound. Alternatively, in the absence of comparative data, an effective amount is any amount that reduces the color of a PVB resin to less than 12 YID. Preferably the YID is less than about 10, more preferably less than about 8, and most preferably less than about 6. Color measurement of the resin can be done according to any conventional or standard practice.

A bleaching compound can be included in an amount of from about 0.01 to about 0.85 pph, based on the weighs of polyvinyl alcohol (PVA) used in the preparation of PVB. Preferably, the bleaching compound is present in an amount of from about 0.05 to about 0.80 pph, more preferably in an amount of from about 0.10 to about 0.75 pph, and most preferably in an amount of from about 0.15 to about 0.70 pph. While color reduction in a PVB sheet is an important consideration, the amount of bleaching compound included will also be a function of the cost of production and the other properties that may be affected by including the additive.

The present invention includes a surfactant. A surfactant suitable for use herein can be any that is known to be useful in the art of polyvinylbutyral manufacture. For example, surfactants suitable for use herein include: sodium lauryl sulfate; alkali salts; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl taurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like. Preferable surfactants include sodium lauryl sulfate, sodium dioctyl sulfocucinate, sodium cocomethyl tauride, and decyl(sulfophenoxy)benzenesulfonic acid disodium salt.

The surfactant can be included in any effective amount for the particular set of process conditions practiced. The surfactant can be included in an amount of from about 0.01 to about 0.85 pph by weight, based on the weight of PVA used to prepare PVB. Preferably the surfactant is included in an amount of from about 0.10 to about 0.80 pph. More preferably, the surfactant is included in an amount of from about 0.15 to about 0.75 pph. Most preferably, the surfactant is included in an amount of from about 0.15 to about 0.70 pph.

The surfactant and the PVB bleaching compound can be the same compound. The bleaching compound is optional only in the event that the surfactant can also perform the function of a bleaching compound. Otherwise the bleaching compound is considered to be essential in the practice of the present invention. For example, DOSS can be used in the practice of the present invention as a surfactant. DOSS can also be a bleaching compound in the practice of the present invention. In one particularly preferred embodiment, DOSS can be included as both a surfactant and as a bleaching compound. In this embodiment, the use of a bleaching compound other than DOSS is optional.

Antioxidants can be optionally included in a PVB resin composition of the present invention during sheet preparation to inhibit the oxidation of the PVB resin and/or components. Preferred antioxidants are known conventionally and available commercially. Most preferred are bis-phenolic antioxidants, which are surprisingly more suitable for preparing low color PVB sheeting, particularly when 3GO is used as plasticizer. Bis-phenolic antioxidants are available and can be obtained commercially. Suitable bis-phenolic antioxidants include 2,2'-ethylidenebis(4,6-di-t-butylphenol); 4,4'-butylidenebis(2-t-butyl-5-methylphenol); 2,2'-isobutylidenebis(4,6-dimethylphenol); and 2,2'-methylenebis(6-t-butyl-4-methylphenol), for example. Bis-phenolic anti-oxidants are commercially available under the tradename of ANOX™ 29, LOWINOX® 22M46, LOWINOX® 44B25, and LOWINOX® 221B46, for example.

An antioxidant can be included in any effective finite amount. Preferably, the antioxidant is included in an amount of from about 0.01 to about 0.6%, based on the total weight of the sheet. More preferably, the antioxidant is present in amount of from about 0.03 to about 0.3%, most preferably in an amount of from about 0.05 to about 0.25%.

Usual adjuvant compounds that are known conventionally to be useful in the PVB and do not adversely affect the impact performance of the laminates obtained therefrom can be included in a resin composition of the present invention. Such additives include: antioxidants, colorants, light stabilizers, particularly UV light stabilizers/absorbers, such as Tinuvin® P; Tinuvin® 326, and Tinuvin® 123. UV light stabilizers can stabilize the PVB composition by absorbing ultraviolet light and preventing unwanted effects by the UV light on the PVB. Adhesion control agents such as alkali and alkaline earth metal salts of carboxylic acids, alkaline earth metal salts of inorganic acids, or a combination of such salts can be added. In the practice of the present invention it should be noted that in automotive windshields, adhesion can be either too high or too low, and should be controlled so as to give maximum protection of the vehicle occupant from being ejected. In architectural and security laminates, it is desirable that adhesion be maximized so that spontaneous delamination does not occur.

In still another embodiment, a laminate article can be obtained from a PVB sheet of the present invention. Procedures for preparing glass/PVB laminates are well known in the art, and a skilled artisan would be able to construct a laminate from the presently claimed PVB sheet. A glass/PVB laminate article as claimed in the present invention can be obtained, for example, by bringing the surfaces of the PVB and glass into contact, and then removing air from the laminate structure in an autoclave. The surface of the PVB can be roughened to facilitate removal of air from the laminate. Other procedures are known and used conventionally. While PVB/glass laminates are described herein, PVB can be used as interlayer material for laminating to other materials such as polycarbonates, polyesters, and/or polyurethanes for example.

Laminates of the present invention contain multiple layers of PVB having a total thickness of at least 0.75 mm. The thickness of the stiff PVB interlayer is preferably from about 20% to about 80% of the total thickness of the total interlayer thickness. More preferably the thickness of the stiff PVB interlayer is from about 22% to about 70%, and most preferably from about 25% to about 60% of the total interlayer thickness.

In a particularly preferred embodiment, use of thin layers of stiff PVB in combination with layers of soft PVB, arranged as described herein, surprisingly enhance the impact resistance of the laminate and avoid the prohibitive manufacturing yield losses incurred using thicker layers of stiff PVB. A stiff PVB layer of the present invention has a thickness of from about 0.25 to about 10 mm, preferably the stiff PVB layer has a thickness in the range of from about 0.35 to about 8 mm. More preferably the thickness is in the range of from about 0.45 to about 6 mm, and most preferably from about 0.50 to about 4 mm.

EXAMPLES

The following Examples and comparative examples are presented to further illustrate the present invention. The Examples are not intended to limit the scope of the invention in any manner, nor should they be used to define the claims or specification in any manner that is inconsistent with the invention as claimed and/or as described herein.

In the examples and comparative examples below, impact resistance is expressed as mean penetration energy. The mean penetration energy is determined by striking a 0.304 m×0.305 m laminate clamped in a vertical frame with a 31.5-kg (70-lb) pendulum impactor fitted with a 76-mm diameter rounded protrusion (bull-nose) at room temperature (21±2° C.). The pendulum set up used in this work was similar to that described in British Standards Institute's AU 209, Part 4, except that the impactor was significantly heavier. Laminates of the same construction are sequentially hit with the impactor at release heights adjusted according to the Bruceton staircase method. If the bull-nose did not penetrate one laminate at a given impactor release height, the impactor release height for the next laminate in the set was increased by 76 mm (3 inches). Conversely, if the bull-nose penetrated a laminate at a given height, the impactor release height for the next laminate in the same set was decreased by 76 mm (3 inches). The mean penetration energy for each set of laminates is the mean potential energy of the impactor required to penetrate the laminate 50% of the time. The mean penetration energy is the product of the mass of the impactor, gravitational acceleration, and the mean penetration height of the impactor. The mean penetration height of the impactor can be calculated using Bruceton staircase statistics as outlined in "Experimental Statistics" by Mary Gibbons Natrella, National Bureau of Standards Handbook 91, Washington, D.C., pages 10–22 to 10–23.

In all the Examples and Comparative Examples below, the PVB interlayers all contain between 50 and 100 ppm potassium as adhesion control additive. This additive was added as potassium formate to the polymer melt during sheet formation.

Comparative Example C1

PVB interlayers containing 35 parts 3GO plasticizer per 100 parts dry PVB resin (35-pph 3GO) totaling 2.54 mm in thickness were laminated between two pieces of 2.3-mm× 30.5 cm×30.5 cm clear annealed float glass that had been washed and rinsed in demineralized water. The glass/PVB/glass assembly was de-aired by placing it in a rubber bag, sealing the bag and then applying vacuum to the bag. After 5 minutes of vacuum de-airing at ambient (about 23° C.) temperature, the entire bag with the assembly and its contents were placed in a 120° C. oven while maintaining vacuum. The rubber bag and its contents stayed in the oven for a total of 20 minutes, after which the bag was removed from the oven and the vacuum hose was disconnected. Eleven laminates made the same way were used for impact testing. The mean penetration energy of this set of laminates was 333 Joules.

Comparative Example C2

Eleven laminates with similar construction as those in Comparative Example C1 except that the PVB interlayers contained 22-pph 3GO. The total interlayer thickness was 2.54 mm. The mean penetration energy was 383 Joules.

Comparative Example C3

Eleven laminates with similar construction as those in Comparative Example C1 except that the PVB interlayers contained 29-pph 3GO. The total interlayer thickness was 2.54 mm. The mean penetration energy was 330 Joules.

Comparative Example C4

Laminates were made with PVB interlayers stacked so that two 0.51-mm plies containing 20-pph 3GO sandwiched two plies of 0.76 mm containing 35-pph 3GO. The stack of PVB sheets was laminated between two pieces of 2.3-mm glass as described in Comparative Example C1. The thickness of all the interlayers combined was 2.54 mm. The average plasticizer content of the interlayer was about 29 pph 3GO, about equivalent to that in Comparative Example C3. Eleven such laminates were used for impact testing. The mean penetration energy was 325 Joules. This is also similar to that of the laminates in Comparative Example C3.

Example 1

Laminates were prepared as in Comparative Example C4 except that the PVB interlayers were stacked so that two plies of 0.76-mm 30-pph 3GO sheeting sandwiched two plies of 0.51-mm 20-pph 3GO sheeting. The thickness of all the interlayers combined was 2.54 mm. The average plasticizer content of the interlayer was about 29 pph 3GO, about equivalent to that in Comparative Examples C3 and C4. Eleven laminates were impacted. The mean penetration energy was 455 Joules, a significant increase over the laminates in Comparative Examples C3 and C4 although the average plasticizer levels were equivalent.

What is claimed is:

1. A laminate article comprising (A) two layers of soft plasticized polyvinylbutyral interlayer sheet having a $T_g$ in the range of from about 32° C. to about 35° C., and (B) a stiff polyvinylbutyral interlayer sheet, wherein the stiff polyvinylbutyral interlayer sheet: (i) has a $T_g$ of from about 35° C. to about 60°°C.; (ii) is positioned between the two layers of soft polyvinylbutyral sheet; and (iii) comprises a bleaching compound in an amount of from about 0.01 to about 0.85 pph, based on weight of polyvinyl alcohol used in the preparation of the polyvinylbutyral used to prepare the stiff polyvinylbutyral interlayer sheet.

2. The article of claim 1 wherein the stiff polyvinylbutyral interlayer sheet includes plasticizer in an amount of from about 5 pph to less than about 30 pph and the bleaching compound is present in an amount of from about 0.05 to about 0.80 pph.

3. The article of claim 2 wherein the plasticizer is present in the stiff polyvinylbutyral interlayer sheet in an amount of from about 15 pph to less than about 30 pph.

4. The article of claim 3 wherein the plasticizer is present in the stiff polyvinylbutyral interlayer sheet in an amount of from about 18 to about 25 pph.

5. The article of claim 4 wherein the plasticizer is present in the stiff polyvinylbutyral interlaver sheet in an amount of from about 18 to about 22 pph.

6. The article of claim 2 wherein the plasticizer is a plasticizer or a mixture of plasticizers selected from the group consisting of: diesters obtained from the chemical reaction of aliphatic diols with carboxylic acids, including diesters of polyether diols or polyether polyols; and, esters obtained from polyvalent carboxylic acids and aliphatic alcohols.

7. The article of claim 6 wherein the plasticizer is selected from the group consisting of: diesters obtained by the reaction of triethylene glycol with aliphatic carboxylic acids having from 6 to 10 carbon atoms; and esters obtained from the reaction of sebasic acid with aliphatic alcohols having from 1 to 18 carbon atoms.

8. The article of claim 7 wherein the plasticizer is triethylene glycol 2-ethylhexanoate.

9. The article of claim 7 wherein the plasticizer is dibutyl sebacate.

10. The article of claim 1 wherein the bleaching compound is present in an amount of from about 0.10 to about 0.75 pph.

11. The article of claim 2 wherein the bleaching compound is present in an amount of from about 0.15 to about 0.70 pph.

12. The article of claim 11 wherein the bleaching compound is a sodium dialkylsulfosuccinates.

13. The article of claim 12 wherein the bleaching compound is sodium dioctylsulfosuccinate.

14. The article of claim 1 wherein the bleaching compound is selected from the group consisting of: sodium dialkyl sulfosuccinates; organic bisulfites; and inorganic bisulfites.

15. The article of claim 1 wherein the bleaching compound is a sodium dialkyl sulfosuccinate.

16. The article of claim 1 wherein the bleaching compound is sodium dioctyl sulfosuccinate.

17. The article of claim 16 wherein the stiff polyvinylbutyral interlayer sheet comprises an antioxidant.

18. The article of claim 1 wherein (1) the article comprises two layers of glass laminated to an interlaver; (2) the interlayer consists essentially of the stiff polyvinylbutyral interlayer sheet positioned between the two layers of soft polyvinylbutyral sheet; (3) the stiff polyvinylbutyral sheet comprises from about 22% to about 70% of the total interlayer thickness and has a thickness in the range of from about 0.50 mm to about 4 mm; and (4) the bleaching compound is selected from the group consisting of: sodium dialkyl sulfosuocinates; and organic bisulfites; inorganic bisulfites.

19. The article of claim 1 wherein the stiff polyvinylbutyral sheet has a thickness in the range of from about 0.25 mm to about 10 mm.

20. The article of claim 2 wherein the stiff polyvinylbutyral sheet has a thickness in the range of from about 0.50 mm to about 4 mm.

21. The article of claim 10 wherein (1) the plasticizer is present in the stiff polyvinylbutyral interlayer sheet in an amount of from about 15 pph to less than about 30 pph, (2) the two layers of soft plasticized polyvinylbutyral interlayer sheet each comprise plasticizer in an amount from about 30 to about 45 pph, based upon the total dry weight of the unplasticized polyvinylbutyral, (3) the stiff polyvinylbutyral interlayer sheet has YID of less the about 10 and is prepared by extrusion at a temperature of 227° C. to about 245° C., and (4) the bleaching compound is selected from the group consisting of; sodium dialkyl sulfosuccinates; organic bisulfites; and inorganic bisulfites.

22. The article of claim 14 wherein the stiff polyvinylbutyral interlayer sheet has a thickness in the range of from about 0.25 mm to about 8 mm.

\* \* \* \* \*

UNITED STATES PATENT AND TRADEMARK OFFICE
CERTIFICATE OF CORRECTION

PATENT NO. : 7,214,433 B2  Page 1 of 1
APPLICATION NO. : 10/509288
DATED : May 8, 2007
INVENTOR(S) : Bert C. Wong and Charles Anthony Smith It is certified that error appears in the above-identified patent and that said Letters Patent is hereby corrected as shown below:

Claim 1, column 7, line 67, "°°", replace with --°--, line should read - to about 60°C; (ii) is positioned between the two layers of Claim 21, column 10, line 2, add --a-- after has and replace --the-- about with "than" about, line should read - interlayer sheet has a YID of less than about 10 and is prepared Signed and Sealed this Twenty-fourth Day of June, 2008

JON W. DUDAS
*Director of the United States Patent and Trademark Office*